United States Patent [19]

Reichert

[11] Patent Number: 5,632,509
[45] Date of Patent: May 27, 1997

[54] TRUCK

[75] Inventor: Edgar Reichert, Bergisch-Gladbach, Germany

[73] Assignee: Zeppelin-Systemtechnik GmbH, Offenburg, Germany

[21] Appl. No.: 106,339

[22] Filed: Aug. 13, 1993

[30] Foreign Application Priority Data

Aug. 14, 1992 [DE] Germany ............... 9210890 U

[51] Int. Cl.[6] ................................. B62D 21/02
[52] U.S. Cl. ................... 280/795; 280/798; 296/204
[58] Field of Search ................... 280/79.11, 784, 280/789, 790, 795, 797, 798, 800, 107, DIG. 8, 786; 296/204, 205, 183, 181, 182, 203

[56] References Cited

U.S. PATENT DOCUMENTS

| 1,821,395 | 9/1931 | Musslewhite | 280/789 |
| 2,119,800 | 6/1938 | Tull | 280/789 |
| 2,197,401 | 4/1940 | Weber | 280/789 |
| 2,329,408 | 9/1943 | Minium | 280/789 |
| 2,366,709 | 1/1945 | Dean | 280/795 |
| 4,639,015 | 1/1987 | Pitts | 280/789 |

FOREIGN PATENT DOCUMENTS

| 1965533 | 7/1971 | Germany | 280/795 |
| 27 16994 C2 | 5/1987 | Germany | B62D 21/00 |
| 1742114 | 6/1992 | U.S.S.R. | 280/789 |

*Primary Examiner*—Anne Marie Boehler
*Attorney, Agent, or Firm*—Seed and Berry LLP

[57] ABSTRACT

The invention relates to a vehicle, such as a truck, comprising a chassis having flexural strength but being torsionable, on which a non-torsionable assembly is arranged above an intermediate frame, the assembly comprising a central tube at its lower side extending in the center of the vehicle, the tube being connected to the intermediate frame at several locations by means of bearings. Such a truck is especially characterized in that the intermediate frame is formed having flexural strength but being torsionable and in that a single three-point bearing is provided between it and the central tube, which comprises a rear, in axial direction fixed, pivot bearing as well as two lateral slide bearings at a transverse beam of the central tube, said pivot bearings having spherical bearing surfaces to which horizontal supports are associated at the intermediate frame.

15 Claims, 3 Drawing Sheets

TRUCK

TECHNICAL FIELD

The invention relates to a vehicle, such as a truck, comprising a chassis having flexural strength but being torsionable on which a non-torsionable assembly is arranged above an intermediate frame, said assembly comprising a central tube at its lower side extending in the center of the vehicle, said tube being connected to the intermediate frame at several locations by means of bearings.

BACKGROUND OF THE INVENTION

A vehicle of this kind is known from the German Patent 27 16 994. It stood the test in practice and was widely used in impassable areas.

In the pre-known solution the non-torsionable structure is connected torsion-free to the intermediate frame by means of two three-point bearings. Thereby, the cross-country ability of the vehicle is achieved; this, however, is also the reason for relatively high production costs.

SUMMARY OF THE INVENTION

The present invention is based on the object to reduce the production cost and still to maintain the cross-country ability of the vehicle as identified in German Patent Application G 92 10 890.3, which is incorporated herein by reference in its entirety.

According to the invention this is achieved in that the intermediate frame is rigid and torsionable and in that a single three-point bearing is mounted between the intermediate frame and the central tube, which comprises a rear pivot bearing which is fixed in axial direction and comprises two lateral slide bearings at a transverse beam of the central tube, said slide bearings having spherical surfaces, with horizontal bearings being attached to their intermediate frame.

In the invention the intermediate frame already is torsionable, so that it is an enforcement of the chassis, but performs a torsion together with the frame. The intermediate frame inhibits the torsional movement and is an elastical intermediate element to the non-torsionable structure.

The invention only comprises a single three-point bearing that includes a rear pivot bearing and two lateral side bearings. The rear pivot bearing serves as a fixed bearing in axial direction and—as being the only bearing—thus receives all delays and accelerations which are performed in driving direction.

Two lateral slide bearings of the transverse beam are arranged in front of the only pivot bearing of the central tube. This results in said only three-point bearing. The bearing surface of the slide bearings are formed spherically so that they are able to receive a portion of the torsions between the vehicle body on one hand and the intermediate frame on the other hand. The two lateral slide bearings contribute to the mounting of the central tube at the rear pivot bearing and are used for compensation of the torsional movement of the intermediate frame occurring during rough driving conditions.

In an advantageous embodiment of the invention, it is provided that the slide bearing has a support of a T-shaped cross-section, the vertical web of which being laterally connected to the intermediate frame, and the section being closer to the vehicle of the horizontal T-bar contacting the upper part of the intermediate frame and forming the bearing for the spherical bearing surface. This support has a plurality of advantages. Due to the T-shape, it is laterally and vertically sufficiently secured at the intermediate frame and in case of a correspondingly long form of the T-bar, it can also serve as an additional attachment to the chassis.

The section of the T-bar which is closer to the vehicle forms the bearing for the spherical bearing of the transverse beam. It is of advantage if the section of the horizontal T-bar, which is distal to the motor vehicle is arranged at a lower level than the section which is closer to the vehicle and the section closer to the vehicle serves for receiving a fastening element which is subjected to the force of a spring. By means of this gradation the bearing is clearly limited for the spherical bearing surface of the transverse beam.

It is also of advantage if a console is connected to the support of the slide bearing on the sides of the transverse beam, said console bearing the spherical bearing surface at its lower side and even the fastening element engaging the outer surface of the console. The fastening element vaults the spherical bearing surface elastically by means of its tensile force and keeps it in the desired spherical vault also in case of rough conditions.

The console is arranged having a vertical tolerance in respect to the section of the horizontal T-bar of the support which is distal to the vehicle, but lateral tolerance is also provided, in case according to an advantageous embodiment the console has a U-shaped cross-section and both legs extend in downward direction, so that they laterally project over the pillow block with clearance. The lateral U-legs form a lateral stop between the structure and the intermediate frame for the relative movement and delimit the relative movement between the spherical bearing surface on one hand and the bearing on the other hand.

The fastening element is preferably formed as a screw bolt, which is guided through bores of the console and through the support, and which is supported by means of a rectangular spiral spring at the support or at the console. The rectangular spiral spring has the advantage, that it supports itself in the completely suppressed condition and thus withstands heavy loads.

The invention will now be described with reference to an embodiment.

DETAILED DESCRIPTION OF THE INVENTION

Figure 1:
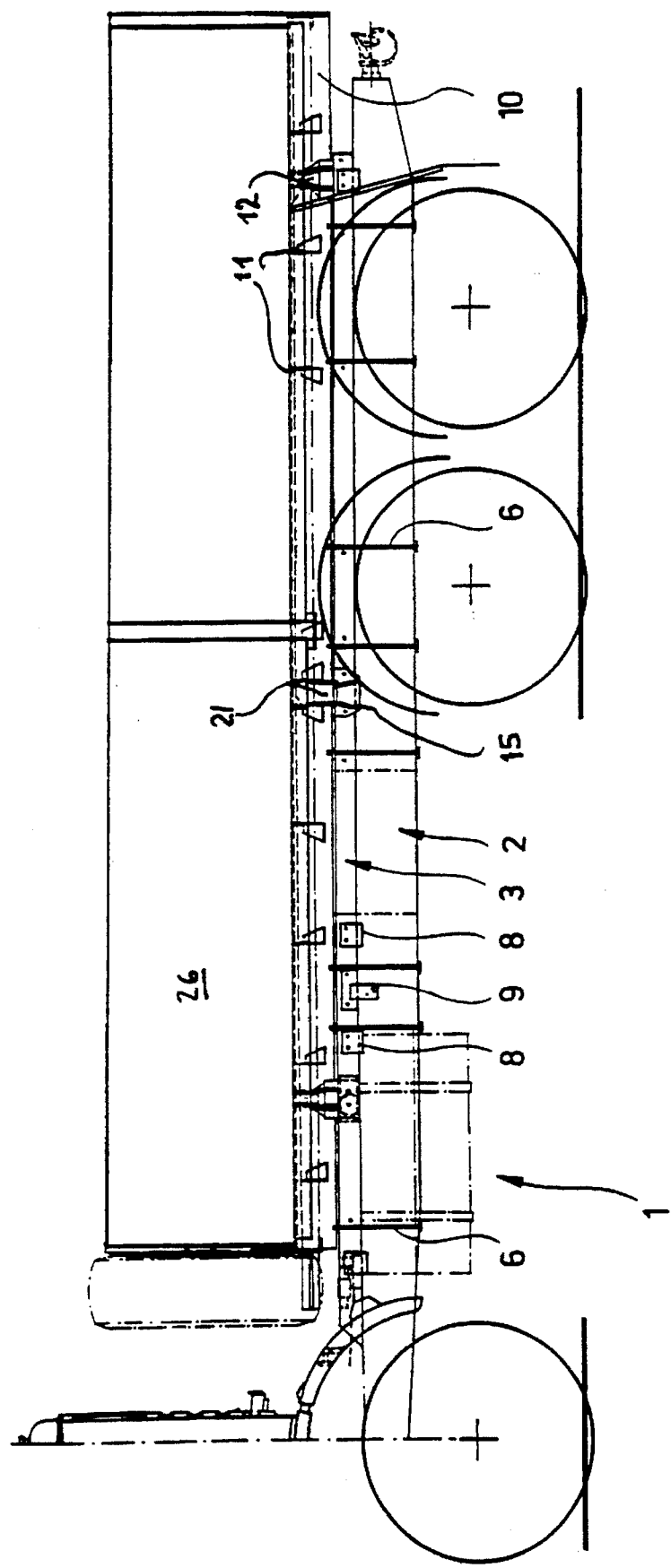
FIG. 1 is a side view of a truck according to the invention.

The truck, or other vehicle, has three axes and comprises a conventional chassis 2 having flexural strength, but being torsionable. It essentially extends from the vehicle engine to the back of the vehicle and comprises two longitudinal supports.

An intermediate frame 3 is put on the loading area of the chassis, said intermediate frame also comprising two longitudinal supports 4 and 5, which are arranged above the longitudinal supports of the chassis directly and with the same direction. They are, however, shorter than the longitudinal supports of the vehicle frame and have less height.

They are advantageously removably connected to the longitudinal carriers of the chassis by means of tension rods 6. A connection via bearing consoles is alternatively possible. The longitudinal supports 4 and 5 are kept apart at a fixed distance by means of transverse supports 7, that are arranged between the longitudinal supports in transverse direction and connected thereto.

Analogous to the chassis, the intermediate frame has flexural strength and is torsionable and it is able to limitedly move and twist in respect to the vehicle frame. In order to keep it laterally correct on the vehicle frame, the lateral stoppers 8 are provided. In order to limit the movement of the intermediate frame relative to the vehicle frame, referred to as the replacement way in longitudinal direction of the vehicle, a double effective axial stopper 9 is provided which limits the replacement way in both axial directions.

By means of the vehicle frame 2 and the intermediate frame 3, the truck 1 is able to receive a non-torsionable vehicle-body. The vehicle-body in turn can be formed in various ways. It can be a stake body 26, a container, a case and so on.

A central tube 10 serves as an interconnecting link between the torsionable intermediate frame and the non-torsionable vehicle-body, said central tube extending in the vehicle longitudinal central axis in driving direction. It comprises a plurality of transverse beams 11 projecting laterally and connected to the lower side of the actual vehicle-body.

Figure 2:
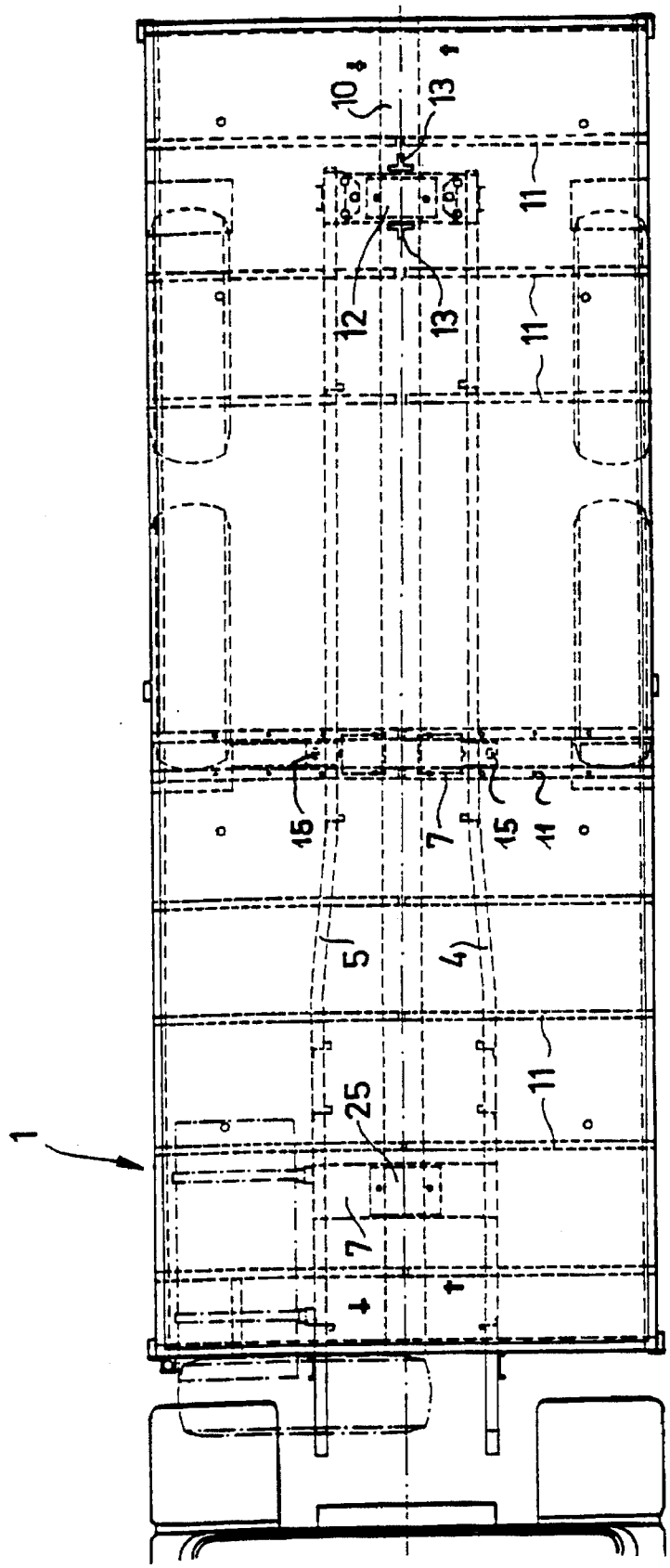
FIG. 2 is the top view.

The vehicle according to the invention comprises a single three-point bearing for connecting the central tube 10 to the intermediate frame 3. The single three point bearing includes a single rear pivot bearing 12 and two lateral slide bearings 14. The single rear pivot bearing 12 is located in the rear vehicle area, around which the central tube is able to rotate around a rotational axis located in the vehicle longitudinal center in the driving direction. This bearing is a support in axial direction. The T-shaped support ribs 13 which are arranged at the outer surface of the central tube serve as stoppers in axial direction and thus fix the central tube in direction of the rotational axis in both directions. The rotational bearing consists of cast steel and comprises a bearing bush which has a semi-annular cross-section. As seen in FIG. 2, there is clearance provided between the support ribs 13 and the rear pivot bearing 12. The support ribs extend from the central tube and are arranged to prevent movement of the intermediate frame 3 in the axial direction by abutting against the bearing bush.

The central tube is completely supported within the pivot bearing, so that even in case of vertical impacts, the vehicle-body does not lift off the intermediate frame. To prevent a lifting out of the bearing bush the central tube is pressed against the bearing bush by a tension element that is for example connected to upper ends of the bearing bush and biased in the direction of the bearing bush. Such a tension element may be for example a sheet-metal strip. Moreover, such a tension element is known from DE 2716994.

Figure 3:
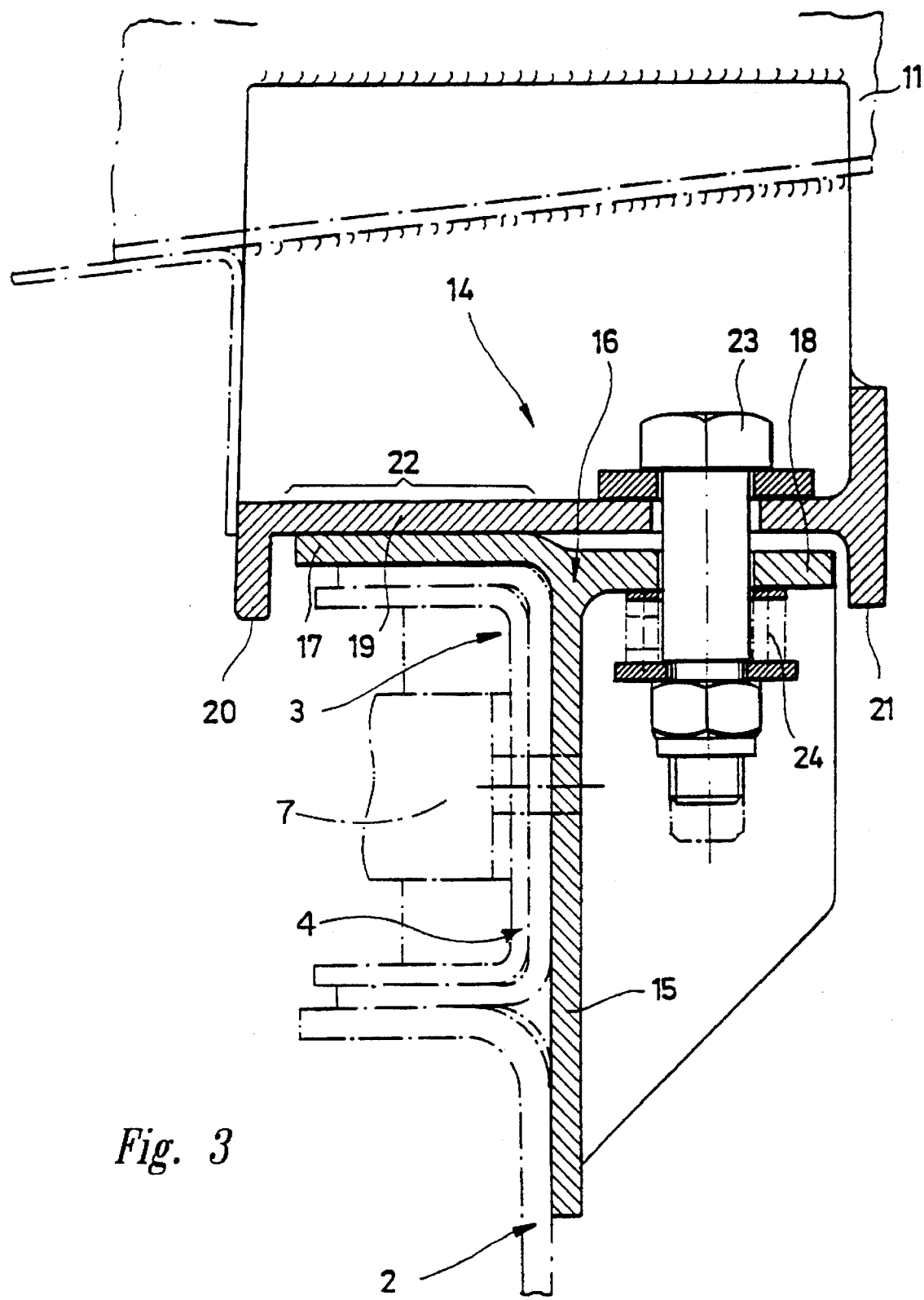
FIG. 3 is a vertical section through a slide bearing.

The three-point bearing is completed by the two lateral slide bearings 14. Their construction can especially be taken from FIG. 3. Accordingly, the three-point bearing provides the only connection between the intermediate frame and the central tube 16.

A longitudinal support of the vehicle frame 2 can be seen, as well as the intermediate frame 3 supported thereon. Each slide bearing has a support 15 having a T-shaped cross-section, the vertical T-bar of which being laterally connected to the intermediate frame 3 by fixing with a bolt. The T-bar is prolonged in vertical direction in a way that it also slightly overlaps the longitudinal support of the vehicle frame 2, to provide a sufficient lateral arrangement in case of torsion of the two frames.

The horizontal T-bar 16 is divided in sections, one of which 17 is being closer to the vehicle and the other one 18 being distal to it. The latter is arranged a bit lower than the first one, in order to create a gap to be described later, for a console 19 being arranged above it and comprises a bore for a spring-loading fastening element.

Thus, the slide bearings allow the vehicle-body to move laterally and longitudinally relative to the intermediate frame during torsion. However, the frames have flexural stiffness but are elastic with respect to torsional forces. Therefore, the frames may be twisted about their longitudinal axis, whereby the central tube 10, which is fixed to the vehicle-body, is rotated in the pivot bearing.

The console 19 is fixed between and mounted below two transverse beams 11 extending laterally from the central tube 10 and having a U-shaped cross-section. Both U-legs 20 and 21 extend downwardly and grip over the support 15 having a lateral tolerance.

The console comprises overlapping sections with respect to the section 17 which is closer to the vehicle wherein the overlapping section has a spherical bearing surface 22 which is spherically supported on the section 17. The spherical curvature of bearing surface 22 is convex and fairly small over a fairly large area, and thus the curvature of the bearing surface can not be seen in FIG. 3. Moreover, the spherical bearing surface 22 is bent by connecting console 19 to section 18 with help of screwbolt 23.

A gap is provided between the console and the section in the area of the section 18 which is distal to the vehicle. A removable connection is provided there between the console and the support in the form of a screw bolt as a fastening element. A longitudinal hole extends in the console extending in vehicle longitudinal direction in order to enable a movement compensation for the screw bolt. The screw bolt is supported with its head at the upper side of the console and its thread is directed downwards. Accordingly, the screw bolt 23 connects the intermediate frame 3 arranged below the section 17 of the support 15 and the transverse beam 11. It holds the console on the support by means of a rectangular spiral spring 24 which is biased. Moreover, the screw bolt leads the console and permanently supports the elastical curvature of the spherical bearing surface 22.

Thus, a little vertical movement of the vehicle-body with respect to the slide bearings may be possible as the spring-loaded fastening element 23 is biased in the direction towards section 18.

A U-shaped support 25 is provided for the central tube at the front end of the intermediate frame 3, if desired, for limiting the extraordinary torsional movements, said support at least partially comprising said central tube. The central tube 10 is supported by and rests in the U-shaped support 25 such that no further restrictions for vertical movement of the vehicle-body is necessary.

The invention is not limited to the described embodiment. It is especially considerable to arrange the spherical bearing surface at the support in the slide bearings, and instead to form the lower side of the console even.

I claim:

1. Vehicle comprising a chassis having flexural strength but being torsionable on which a non-torsionable assembly is arranged above an intermediate frame having horizontal supports, said assembly comprising a central tube having a transverse beam, the central tube being connected to the intermediate frame, wherein the intermediate frame has flexural strength and is torsionable and one single three-point bearing is provided between the intermediate frame and the central tube, said single three-point bearing comprising a rear pivot bearing coupled to the central tube and fixed with respect to axial movement relative to said intermediate frame, as well as two lateral slide bearings at the transverse beam of the central tube, said lateral slide bearings having spherical bearing surfaces that support said central tube.

2. Vehicle according to claim 1, wherein the intermediate frame is movable in a longitudinal direction but non-movable in a vertical direction on the chassis.

3. Vehicle according to claims 1 or 2, wherein each lateral slide bearing has a support of a T-shaped cross-section with a vertical bar and a horizontal bar of the T-shaped support, said vertical bar being laterally connected to the intermediate frame and a section of the horizontal bar closer to the central tube being supported on an upper side of the intermediate frame and forming the support for the spherical bearing surface.

4. Vehicle according to claim 3 wherein the horizontal bar has first and second sections, said first section being closer to the central tube than said second section is to the central tube, said first section being distal to said second section, said second section being located lower than said first section and said second section is adapted to receive a fastening element being subjected to the force of a spring.

5. Vehicle according to claim 3, wherein a console is associated with each support of the slide bearing on the sides of the transverse beam, said console comprising said spherical bearing surface at its lower side.

6. Vehicle according to claim 5, wherein the console has a U-shaped cross-section and both U-legs are extending downwardly and laterally project over the respective support of the slide bearing with clearance.

7. Vehicle according to claim 5 wherein the console is connected to the lateral slide bearing with a fastening element, the fastening element being formed as screw bolts guided through bores of the console and the respective support of the slide bearing, said fastening element being supported by means of a rectangular spiral spring.

8. Vehicle according to claim 1 or 2 wherein each lateral slide bearing has a support of a T-shaped cross section and the pivot bearing consists of cast steel and comprises a bearing bush with semi-annular cross-section for receiving the central tube, said bearing bush being flanged on both sides for axial fixation of T-shaped support ribs arranged at an outer surface of the central tube.

9. Vehicle according to claim 6 wherein the console is connected to the lateral slide bearing with a fastening element, the fastening element being formed as screw bolts guided through bores of the console and the respective support of the slide bearing, said fastening element being supported by means of a rectangular spiral spring.

10. Vehicle according to claim 5 wherein the pivot bearing consists of cast steel and comprises a bearing bush with semi-annular cross-section for receiving the central tube, said bearing bush being flanged on both sides for axial fixation of T-shaped support ribs arranged at an outer surface of the central tube.

11. Vehicle according to claim 6 wherein the pivot bearing consists of cast steel and comprises a bearing bush with semi-annular cross-section for receiving the central tube, said bearing bush being flanged on both sides for axial fixation of T-shaped support ribs arranged at an outer surface of the central tube.

12. A vehicle comprising:

a chassis having an intermediate frame, said intermediate frame having flexural strength and being torsionable; and a non-torsionable assembly positioned above said intermediate frame, said non-torsionable assembly including a central tube connected to said intermediate frame, and a three-point bearing coupling said intermediate frame to said central tube, said central tube having a transverse beam, and said three-point bearing including a rear pivot bearing coupled to said central tube and fixed with respect to axial movement relative to said intermediate frame, and two lateral slide bearings connected to said transverse beam of said central tube and coupled to the intermediate frame, said lateral slide bearings having spherical bearing surfaces supporting said central tube.

13. The vehicle according to claim 12, wherein the intermediate frame is movable in a longitudinal direction but non-movable in a vertical direction on the chassis.

14. The vehicle according to claim 12 wherein each lateral slide bearing has a support of a T-shaped cross-section with a vertical bar and a horizontal bar, said vertical bar being laterally connected to said intermediate frame and a section of said horizontal bar that is closer to said central tube being supported on an upper side of said intermediate frame and supporting said spherical bearing surface.

15. The vehicle according to claim 12 wherein each lateral slide bearing has a support of a T-shaped cross-section and said pivot bearing includes a bearing bush with a semi-annular cross-section, said central tube extending through said bearing bush, said bearing bush being flanged on both sides for axial fixation of T-shaped support ribs adjacent to an outer surface of said central tube.

* * * * *